June 10, 1930.  W. G. WILSON  1,763,029
GATE VALVE
Filed Sept. 27, 1928  3 Sheets-Sheet 1

INVENTOR.
Wylie G. Wilson.
BY James L. Stewart
ATTORNEYS.

June 10, 1930.  W. G. WILSON  1,763,029
GATE VALVE
Filed Sept. 27, 1928   3 Sheets-Sheet 2

INVENTOR.
Wylie G. Wilson
BY James L. Stewart
ATTORNEYS.

INVENTOR.
Wylie G. Wilson
BY James L. Stewart
ATTORNEYS.

Patented June 10, 1930

1,763,029

UNITED STATES PATENT OFFICE

WYLIE G. WILSON, OF JERSEY CITY, NEW JERSEY, ASSIGNOR TO EVERLASTING VALVE COMPANY, A CORPORATION OF NEW JERSEY

GATE VALVE

Application filed September 27, 1928. Serial No. 308,770.

This invention relates to an improvement in valves, and particularly to means for holding relatively movable parts of such valves in a predetermined resilient relation.

In certain forms of valves, such for instance as gate vales, one or or more sealing elements are provided to cooperate with suitable valve seats, and such sealing elements are held in position by a resilient element which usually takes the form of a spring. The type of spring employed in valves of this nature is generally a helical spring of cylindrical form. Such springs have been found to be unsatisfactory for reasons hereinafter more fully stated, and it is the purpose of this invention to substitute for springs of helical and cylindrical form a type of spring which may be characterized as a progressive helix; that is to say, the convolutions are related to each other in the form of a helix but they develop into a hollow cone. A more detailed description of this spring will be supplied later.

In illustrating this invention a throughway gate valve has been shown wherein two conduits through the casing are in axial alignment and in jutxaposition. Between the ends of these conduits suitable valve disks, or other suitable sealing elements, are interposed. It is desirable that the ends of these conduits be brought as near together as is possible in order that the column of liquid flowing through the casing may be unbroken and pass from one conduit to the other without expansion into that part of the conduit which is provided for the operation of the sealing elements. The proximity of such conduits in the construction of such a valve is dependent upon the capacity of the spring employed to operate axially within a relatively shorter or longer axial movement.

One of the advantages claimed for the spring of this invention lies in the fact that it is active within a short axial movement as compared with the axial movement of a helical spring of cylindrical form. For instance, where a helical spring of cylindrical form is interposed between two relatively movable elements, the activity of such a spring is limited as follows. When such a spring is compressed so that the convolutions of its cylindrical and helical form physically engage, it can be compressed no further. Hence such fully compressed section may be termed its dead section, and in the assembling of the parts said dead section becomes a definite abutment interposed between the parts that are to bear to each other a resilient relation. Hence said parts cannot be brought more nearly together than is permitted by the presence of said abutment. The field of activity of such a spring must therefore exist in a direction axial of such abutment and beyond the same. To provide sufficient resiliency therefore, it is necessary that such a spring be made sufficiently long in the direction of its axis to provide such resiliency; that is to say, the length of the resilient section must be added to the length of the dead section. Hence the parts between which such a spring is interposed must be proportionately separated a sufficient distance to allow for the activity of the spring.

In contradistinction to the operation of a helical spring of cylindrical form, the spring of the instant case is capable of being collapsed to a point where all of the convolutions lie within the same plane, and hence the dead section of such a spring is measured by the caliber of the cross section of the wire of which it is composed, and consequently in the use of such a spring with a valve having through-way conduits, as described, it is possible to bring such conduits closer together with the resultant advantage stated.

The spring of the instant case is preferably made of tempered wire formed, as stated, in what may be described as a progressive helix, the convolutions of such wire, when expanded, developing into a hollow cone having a broad base and an apex; the convolutions being such that when the spring is depressed axially said convolutions will pass each the other without making contact and, when fully compressed, will lie in a plane common to all of such convolutions. Hence, as stated, the dead section of such a spring is limited to the cross section of any one of its convolutions. When such a spring is relieved of axial pressure, its axial thrust is equal to the normal axial dimension of the spring, less the thickness of one convolution.

In the construction of helical springs of cylindrical form, in order to obtain the necessary elasticity within the limited space available, it has heretofore been found necessary to employ wire of a relatively small cross section, and to temper this wire to a high degree. These two factors operate to weaken the spring, the high temper lending itself to easy fracture, and the thinness of the wire offering but slight resistance to the corrosive action of acids and the like.

In the construction of the spring of the instant case, it is possible and desirable that the wire employed be relatively heavier than that heretofore described in the helical spring of cylindrical form. Furthermore, it is possible and desirable that such heavier wire be subject to a lesser degree of temper. Both of these features lend themselves to the greater durability and permanence of the spring, for the reason that the thicker the wire, the less likely it is to be destroyed by corrosion, and a spring that carries a lesser degree of temper is less liable to break than one of a high temper.

The present invention does not consist merely in the substitution in valve construction of any well known conical helical spring in lieu of the cylindrical helical spring generally employed in this connection. Prolonged study and experimentation have convinced me that conventional conical helical springs such as are known to the arts generally will not properly function when associated with the sealing elements of a gate valve. The majority of such springs are so formed that they are not collapsible under maximum load to a degree wherein all of their convolutions can come within a common plane and are therefore not susceptible to operation within the minimum dimensions of which the spring of this invention is capable. Furthermore, the known conical helical springs will not react when placed under compression between flat, parallel surfaces to produce a truly axial pressure in a direction perpendicular to such surfaces, but, on the contrary, they all have a tendency to tilt and to react in directions having non-perpendicular relation to such surfaces.

In gate valve construction, the sealing element or elements of the valve slide in the arc of a circle into and out of registration with the valve ports over flat arcuate seats. In this type of valve the sealing elements are floatably carried by the operating arm of the valve so that as the elements are slid over their seats, the resulting friction between the elements and their seats will be free to cause the rotary movement of the elements. This rotary movement constantly occurs during the bodily movement of the sealing elements and is of first importance in valves of the character under consideration. The importance of such rotary movement of the sealing elements is found in the fact that by such rotation the coacting surfaces of the sealing elements and their seats are constantly ground. Furthermore, as the sealing elements are moved different points in their faces are subjected to constant change in relation with respect to their seats, so that uniform wear and resulting tight seal is assured throughout prolonged periods of operation. The sealing elements must moreover be maintained at all times flat upon their seats in order to produce the rotary movement referred to and furthermore to preclude the entrance of grit or other extraneous matter between the sealing faces of the elements and the seat. When the elements are held with uniform pressure against their seats, the seats will be swept free from sediment or other extraneous deposits and the rotary movement of the sealing elements to which I have referred will result when the operating arm of the valve is actuated to open and close the valve.

My experiments have conclusively shown that such rotation cannot take place unless the sealing elements bear upon their seats with uniform pressure throughout. It therefore follows that if the sealing elements are to properly function under spring pressure, the spring for supplying such pressure must apply it to the sealing elements in a manner to produce the uniform pressure upon the seats as stated. It is extremely difficult, if not practically impossible, to obtain such a uniform pressure through the employment of known types of conical helical springs. They invariably have a tendency to tilt or laterally bend when compressed between parallel surfaces, and, as a result, are not capable of performing the functions required of a pressure spring in a gate valve.

The primary object of the present invention, therefore, is of a two-fold nature in that it is the purpose of the present invention to provide not only a valve wherein a sealing element or elements are operable within a minimum axial dimension, but also to provide such a construction wherein the pressure applied to the sealing elements will be uniformly transmitted by the sealing elements to the seats. These objects gave rise to numerous practical problems which I have discovered can only be satisfactorily solved through the employment of a spring of peculiar, novel characteristics. For example, a spring capable of performing the functions herein required of it must not only be of conical, helical shape and the convolutions must not only be so related to one another that the spring may be collapsed into a common plane without adjacent convolutions contacting with one another; but such spring must also be so formed that the termini of the helix lie approximately in a plane parallel to the axis of the spring and common to one radius of said axis.

It has been found that this latter feature is one of marked, practical importance, for the reason that a spring so constituted will impart to the sealing elements of the valve that truly, axial pressure so important to efficient operation of the sealing elements as specified. A spring so constructed will not tilt when placed between two relatively movable parts, but when applied to varying degrees of compression will react along an axis perpendicular to the surface against which the larger end of the spring is seated. In contradistinction, other forms of conical, helical springs which have been used for various purposes in the arts generally will invariably react under like conditions of compression in a direction which is not truly perpendicular, with the result that their small ends will creep and bring about pressure in opposite directions which is perpendicular to neither of the surfaces between which the spring is acting.

It has been found desirable, but not necessary, in the operation of the spring of the instant case, to provide the spring with an axial aperture at the apex thereof, and to introduce into said aperture a stud provided with a hemispherical head, the highest point of said head being in the line of the axis of the stud and also of the spring. The purpose of this device is to centralize the pressure at any given point and to allow that part which is borne upon by the head freedom of rotary movement. On the other hand, it is desirable that the broad base of the hollow cone should be firmly seated so as to prevent the liability of displacement for any reason. It is observed that, in the operation of the long helical springs of cylindrical form, it is difficult to prevent bending or tilting, and such displacement is stimulated by corrosion or by any shock or accident that may befall the valve in assembly or in transit; whereas in the instant case the spring is seated on a broad base and therefore not easily displaced. It is a spring that may be made of large wire to offer practically any desired resistance to compression without any short bending of coils, a spring which can be made exceedingly short measured along its axis, and provision is made so that the apex of the spring is provided with an anti-friction device so that in it bearing against the relatively movable part with which it is associated, the frictional engagement between the two may for all practical considerations become negligible. It will be observed also that owing to the long radius of the bending action when the spring is compressed, it is, as a matter of practical experience, impossible to break the wire by repeated compressions of the spring which occurs in the operation of such valves.

Features of the invention, other than those specified, will be apparent from the hereinafter description and claims, when read in conjunction with the accompanying drawings.

The accompanying drawings illustrate one practical embodiment of the invention, but the construction therein shown is to be understood as illustrative only, and not as defining the limits of the invention.

Figure 1:
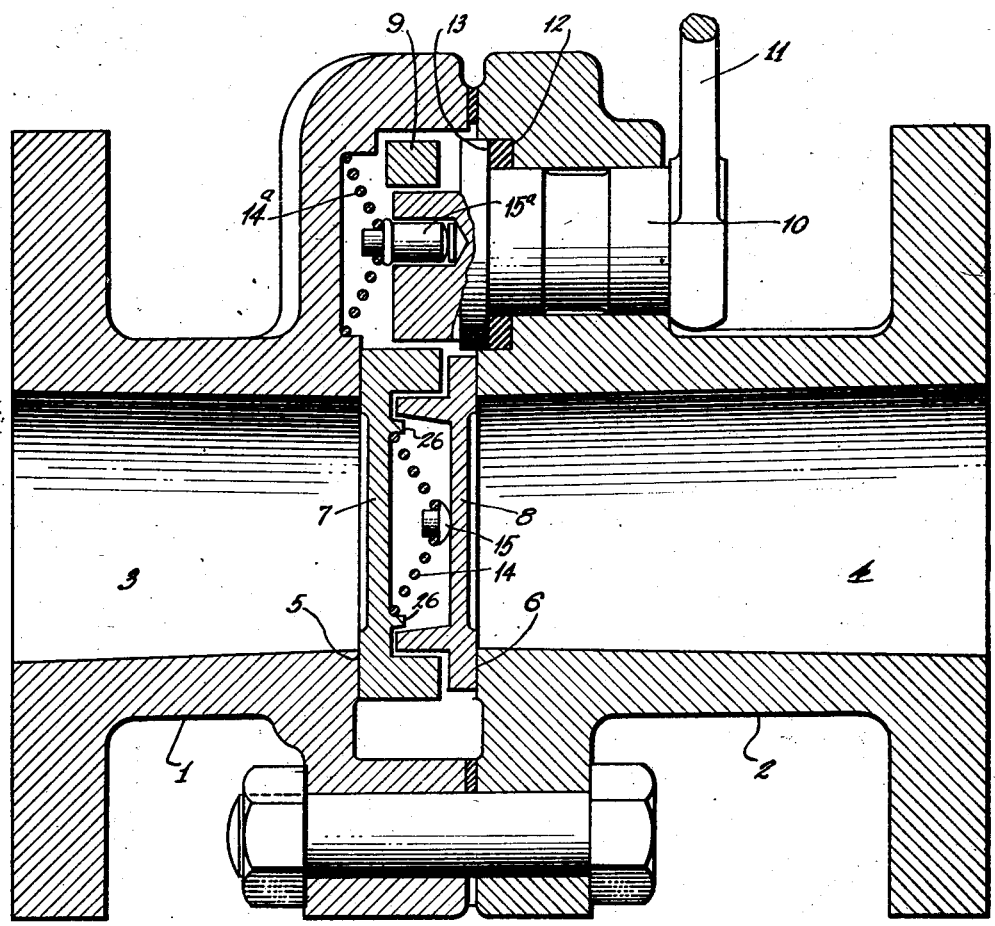
Figure 1 is a vertical section of a slide valve embodying the present invention.

In Figure 1, I have illustrated a well known type of gate valve in central section. The valve embodies a casing comprising two sections 1 and 2 with a conduit passing through the same. One part of the conduit is designated 3 and the other part is designated 4. 5 and 6 indicate flat seats at the juxtaposed ends of the respective conduits. 7 is a sealing element or disk adapted to cooperate with the seat 5, and 8 is the corresponding disk cooperating with the seat 6. The sealing elements or disks 7 and 8 have interfitting relation as shown and they are collectively associated with an operating arm 9, by means of which they may be moved over the seats 5 and 6 into and out of registration with the conduits 3 and 4 to close or open the valve as may be desired.

The operating arm 9 is adapted to be actuated by a post 10 to which is affixed a lever 11 and a gasket 12 cooperates with a shoulder 13 to preclude leakage around the post. By means of the lever 11, the operating arm is oscillated to move the sealing elements into and out of registration with the passages of the valve as stated.

In practice the surfaces 5 and 6 at the ends of the respective conduits or passages are made sufficiently extensive to form guides for the sealing elements throughout the entire extent of their travel, so that as the sealing elements swing to and fro, they traverse these seats which form guides for said elements during these operations.

In valve construction of the type shown, it is the practice to interpose a spring between the elements 7 and 8 in order to hold these elements in engagement with their respective seats, and it is also the practice to position a spring to bear against the inner end of the post 10 in order to hold the shoulder 13 against the gasket 12 and maintain a tight joint at this point.

Helical springs have generally been employed for these purposes, but when a helical spring is used, the adjacent ends of the conduits 3 and 4 have to be positioned much further apart than is shown in the drawing.

It is one purpose of the present invention to bring these ends as close together as possible in order that the flow of liquid through the valve be substantially uninterrupted when the valve is opened. It is for this reason that the peculiar form of spring which I have hereinbefore referred to is employed in this connection. One of these springs, designated 14 is positioned between the sealing elements 7 and 8, and another such spring 14ᵃ is positioned back of the post 10.

The spring 14 has associated with its apex a stud 15 having a semispherical head and a shank which extends into the uppermost convolution of the spring. Similarly the spring 14ᵃ has associated therewith a stud 15ᵃ of slightly different shape, but performing the same function as the stud 15. The springs 14 and 14ᵃ are identical in form and a description of the former will therefore suffice for both.

Figure 2:
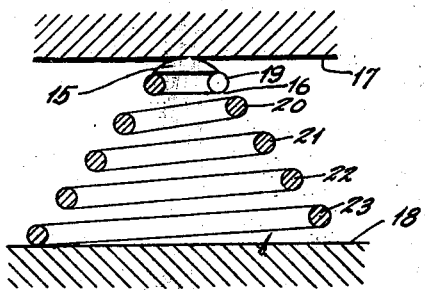
Figure 2 is a vertical section of the spring of this invention with an anti-friction stud attached thereto, such stud and spring being interposed between two relatively movable surfaces, the spring in this instance being shown fully expanded.
Figure 3:
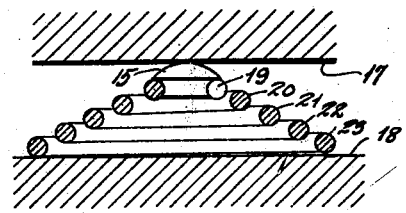
Figure 3 is the same as Figure 2, with the surface between which it is associated depressed in the line of the axis of the spring so as partly to compress the spring.
Figure 4:
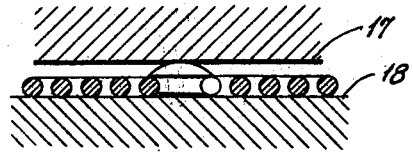
Figure 4 shows the surfaces between which the spring is interposed as depressed in the line of the axis of the spring so as to cause the convolutions of the spring to lie in a plane parallel with one of said surfaces.
Figure 5:
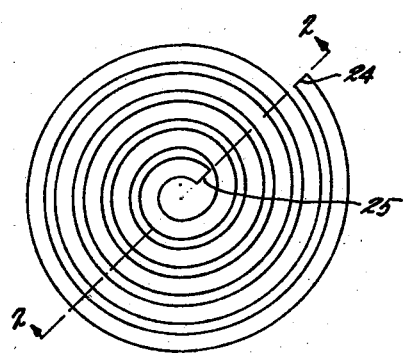
Figure 5 is a plan view of the spring without the anti-friction stud.

In this connection, attention is directed first to Figures 2 to 5 inclusive. These figures show the spring in enlarged scale and in different conditions of compression. In Figure 2, the spring is shown as free from compression, in Figure 3, it is shown as compressed to substantially one half of its normal axial dimension, while in Figure 4, it is shown as fully compressed so that all of its convolutions occupy a common plane. Figure 5 shows a plan view of this spring.

In Figures 2 to 4, the stud 15 is shown with the substantially semi-spherical head and as having a shank 16 which is circumferentially channelled or grooved so as to be engaged by the uppermost convolution of the spring in a manner to preclude inadvertent displacement of the stud from the spring when pressure is released. In the figures under consideration the spring is shown as positioned between two parallel surfaces 17 and 18 which correspond to the juxtaposed faces of the sealing elements 7 and 8.

Particular attention is directed to the spring construction as illustrated in Figures 2 to 5. The spring as here shown is in the form of a progressive helix or hollow cone. This helix, while unitary, is composed of what are characterized as convolutions. They are designated by the reference numerals 19, 20, 21, 22 and 23 and they are shown in Figures 2 to 4, inclusive, as in section in the plane of the line 2—2 appearing on Figure 5. 24 and 25 designate the respective termini of such convolutions.

Particular attention is called to two fundamental characteristics of the spring under consideration, viz., the convolutions are so formed that when the spring is placed under compression between the surfaces 17 and 18, the convolutions thereof, while adjacent each to the other, do not make contact with one another and when fully compressed, as illustrated in Figure 4, all of said convolutions lie in a common plane, the depth of which corresponds to the diameter of the wire from which the spring is formed. Under these conditions, it will be obvious that the spring may be subjected to a crushing strain without injury to the convolutions or to the spring as a whole and when such strain is relieved, it will react along the lines of the axis of the spring.

I also particularly call attention to the fact that the termini 24 and 25 of the spring are positioned as stated, to wit, approximately in a plane parallel with the axis of the spring and common to one radius of said axis as shown by the line 2—2 in Figure 5. This latter feature is of marked importance as will be apparent from the following discussion of the diagrammatic figures of the drawings.

Figure 6:
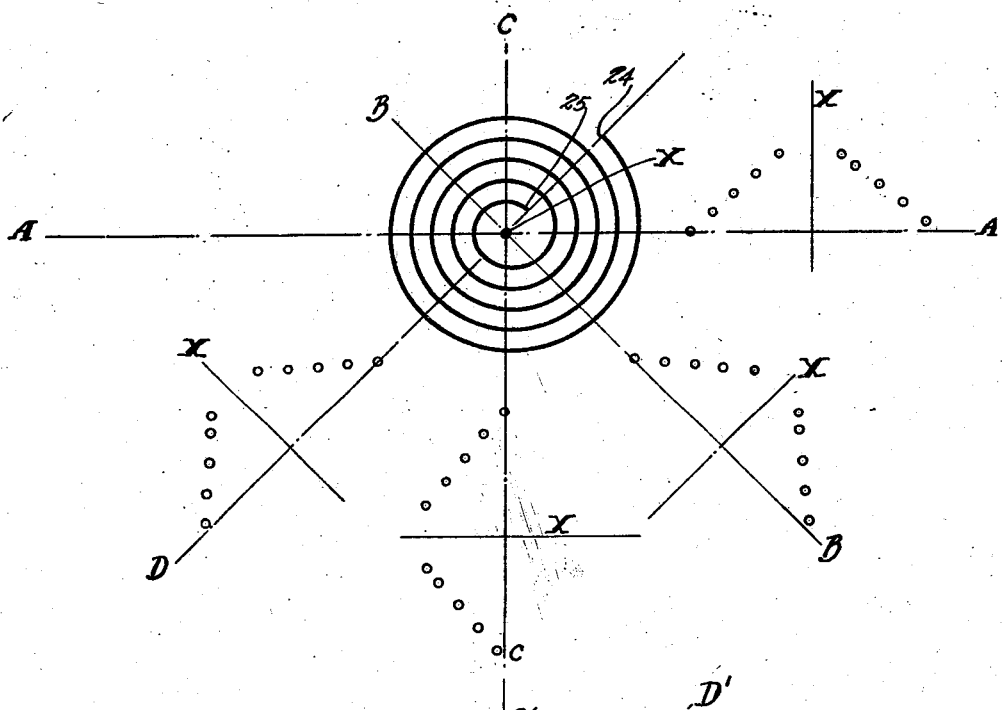
Figures 6 and 7 are diagrammatic views wherein the structure of the spring of this invention is compared with conical, helical springs of the prior art.

Figure 6 shows a diagrammatic plan view of the spring 14 and I have passed through the axis X a number of lines indicating planes which intersect said axis. These planes are designated A, A, B, B, C, C, and D, D and associated with each of these lines, I have shown the section of the spring in the corresponding plane. Particular attention is called to the fact that in the four sections illustrated, the spring is symmetrical about its axis in each instance. In other words, in each of these four sections, there are the same number of convolutions of the spring on each side of the axis. This is brought about by the fact that the termini 24 and 25 of the spring are positioned in substantially the plane D, D and at one and the same side of the axis X.

Figure 7:
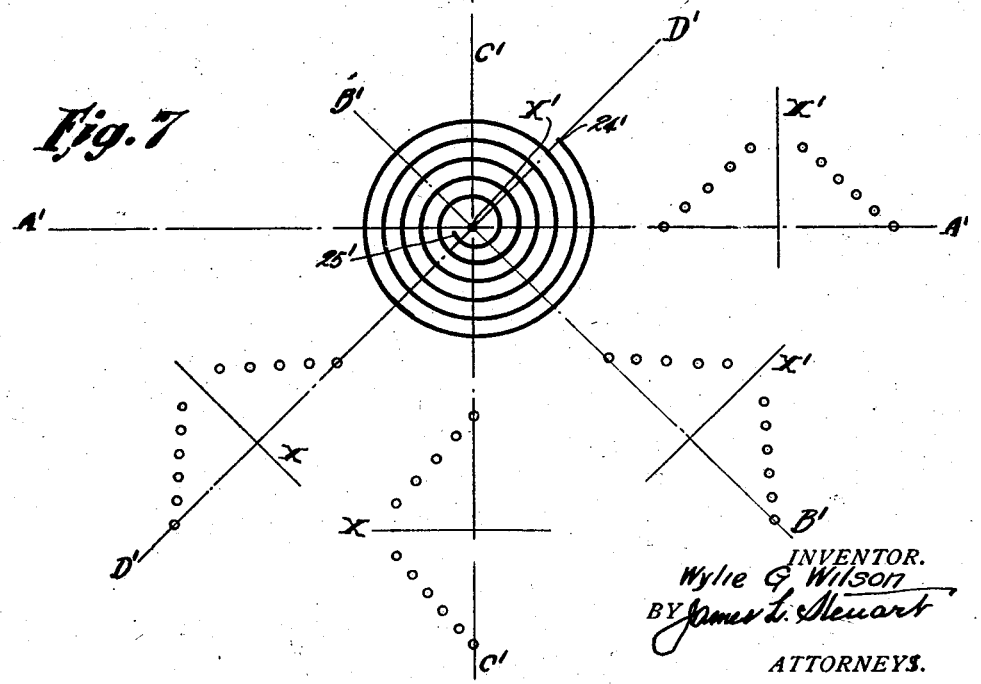

In order that the arrangement of the spring of this invention, which is clearly apparent in Figure 6, may be compared with conventional, conical, helical springs known to the arts in general, I have shown the usual spring construction diagrammatically in Figure 7 in a manner corresponding to the showing in Figure 6, and have opened up the convolutions somewhat to make the comparison clearer. In the two figures (6 and 7), like parts are designated by like reference characters with primes in the latter figure.

It will be noted that in Figure 7, the terminal 24' at the large end of the helix is at substantially the plane D', D' while the terminal 25' at the small end of the helix is at substantially the plane A'—A'. This is a manner commonly employed in the various arts in the manufacture of conical, helical springs and the resust is that the several sections taken at the planes designated show a non-symmetrical formation at each side of the axis of the spring in each instance. Note, for example, the section at the plane A', A'. There is one more convolution at the right hand side of the axis X' than at the left hand side.

Figure 8:
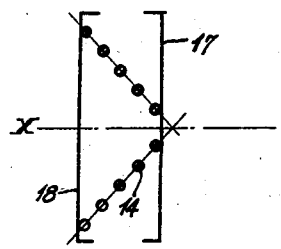
Figures 8 and 9 are also diagrammatic views collectively affording a comparison between the mode of operation of applicant's spring and the manner in which conical, helical springs of the prior art operate in the same environment.

It will thus appear from a comparison of Figures 6 and 7 that while applicant's spring is symmetrical throughout, the conical springs of the prior art are not so constructed. This difference renders the springs of the prior art inoperative to properly function in an environment wherein the spring of this invention functions with the highest utility. The reasons for these differences, in the practical application of a spring to a gate valve is rendered clearly apparent from the comparison of Figures 8 and 9. The spring 14 is shown compressed between surfaces 17 and 18 in Figure 8. When such a spring is compressed between these surfaces, the fact that the spring is symmetrical about its axis X will make all portions of the circumference of the spring uniformly compressible with a resultant axial reaction along the line X which will be perpendicular to both the surfaces 17 and 18. There will thus be no tendency of the spring to tilt nor any tendency of the spring to exert any more pressure on one side of the axis than on any other side thereof.

Accordingly, if the surfaces 17 and 18 are the adjacent faces of two valve sealing elements, it necessarily follows that the action of the spring upon these elements will be in an axial direction and there will be no tendency of the spring to tilt either element. Accordingly, these elements will both press upon the valve seats with uniform pressure throughout.

Figure 9:
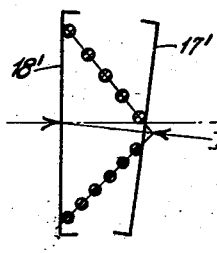

If reference is now had to Figure 9, it will be noted that the same conditions do not there exist for the spring is not symmetrical about the axis X'. Here, for the purpose of illustration, the section shown is as taken in the plane A', A' of Figure 7, so that there are six convolutions on one side of the axis X' and only five on the other side of said axis. As a result, the side having five convolutions will apply a greater pressure than the side having six convolutions so that there is a tendency to tilt the surfaces 17' and 18' as shown and to tilt the axis of the spring as shown at X''.

In valve construction, it is not possible for the sealing elements to tilt as shown, but this tendency to tilt is manifested by increased pressure on the side where there are only five convolutions and a simultaneous tendency to creep and, in practice, an actual creeping of the small end of the apex of the spring in a direction away from the side of the spring which is imparting the greatest pressure with consequent tilting of the spring and corresponding non-axial application of pressure to the sealing elements. There results a non-uniform pressure of the sealing elements throughout their surfaces and a marked tendency of portions of the sealing elements to lag during movement over their seats. This defeats the advantages inherent in the fundamental principles of the floating operation of the sealing elements of a gate valve and brings about unequal wear, improper sealing and relatively short life in operation.

I have not considered it necessary to show in these diagrammatic figures a stud associated with the spring. It may or may not be used in practice, although it is preferable as it minimizes friction between the parts and permits the sealing elements to more readily revolve as is desired. It also is preferable to so support the large end of the spring as to maintain this end in axial relation to the associated sealing element and to accomplish this an annular wall 26 is generally formed on the sealing element 7 as shown in Figure 1.

It will be noted that the spring 14 is seated on a broad base and is therefore not easily tilted or distorted from its primary position. Moreover, the stud engages with the associated sealing element in point contact. Consequently, a minimum friction is established between these parts, thus leaving the sealing elements free to rotate on their common axis as they are moved from open to closed position and vice versa.

It is desirable that the convolutions of the spring of this invention be so disposed about the central axis of the spring that radii emanating from said axis in planes perpendicular to said axis engage said convolutions at distances from said axis in arithmetical progression. This is stated as a general rule and for the purpose of making clear the exact construction of the spring. Of course slight variations from this formula would not depart from the spirit of the invention. It is, however, of the first importance that the said progressive helix of said hollow cone should be formed so that the convolutions of said helix, when axially compressed, will pass each the other in adjacent relation but without contact so that when fully compressed said convolutions will lie in a common plane.

It is also desirable that the termini of said helix shall lie approximately in a plane parallel with said axis and common to one radius of said axis. Satisfactory results may be attained when the said termini are not exactly in the plane of a common radius, but experience has demonstrated that the position indicated is the most suitable to accomplish the purposes contemplated.

The operation of the valve as hereinbefore described, and, when employing a spring of the character specified, has been found to be highly satisfactory for the reasons hereinbefore stated, and while the use of such a spring has been indicated in specific relation to a valve of a certain type, it will be understood that the invention is fully commensurate with the appended claims.

Having thus fully described the invention, what I claim as new and desire to secure by Letters Patent is:

1. In a gate valve, a casing having two ports in axial alinement and in relative proximity, said ports provided with parallel seats, sealing elements cooperating with said seats, elastic means interposed between said sealing elements, said means comprising a spring in the form of a progressive helix or hollow cone the convolutions of said helix being such that when the spring is axially compressed said convolutions can pass each the other without contact, and when fully compressed said convolutions will lie in a common plane, whereby the said seats may be positioned in relatively close proximity.

2. In a gate valve, a casing having two ports in axial alinement and in relative proximity, said ports provided with parallel seats, sealing elements cooperative with said seats, elastic means interposed between said sealing elements, said means comprising a spring in the form of a progressive helix or hollow cone the convolutions of said helix being such that when the spring is axially compressed said convolutions can pass each the other without contact, and when fully compressed said convolutions will lie in a common plane, whereby the said seats may be positioned in relatively close proximity, said spring having at its apex an axial aperture, and a stud having a suitable head provided with a shaft fitting loosely into said aperture with the head engaging the apex of said spring, whereby the head of the stud is adapted to engage with one sealing element while the larger end of the spring is bearing against the other sealing element, and means on the sealing element which is engaged by the larger end of the spring for centralizing the spring with respect to such sealing element, while the head of the stud is adapted to centralize itself with respect to the other sealing element.

3. In a gate valve, a casing having two ports in axial alinement and in relative proximity, said ports provided with parallel seats, sealing elements cooperative with said seats, elastic means interposed between said sealing elements, said means comprising a spring in the form of a progressive helix or hollow cone the convolutions of said helix being such that when the spring is axially compressed said convolutions can pass each the other without contact, and when fully compressed said convolutions will lie in a common plane, whereby the said seats may be positioned in relatively close proximity, said spring having the further characteristic that the termini of said helix are positioned in a plane including the axis of the spring and ports including also one radius of said axis.

4. In a gate valve, a casing having two ports in axial alinement and in relative proximity, said ports provided with parallel seats, sealing elements cooperative with said seats, elastic means interposed between said sealing elements, said means comprising a spring in the form of a progressive helix or hollow cone the convolutions of said helix being such that when the spring is axially compressed said convolutions can pass each the other without contact, and when fully compressed said convolutions will lie in a common plane, whereby the said seats may be positioned in relatively close proximity, said spring having the further characteristic that the termini of said helix are positioned in a plane including the axis of the spring and ports including also one radius of said axis, said spring having at its apex an axial aperture, and a stud having a suitable head provided with a shaft fitting loosely into said aperture with the head engaging the apex of said spring, whereby the head of the stud is adapted to engage with one sealing element while the larger end of the spring is bearing against the other sealing element, and means on the sealing element which is engaged by the larger end of the spring for centralizing the spring with respect to such sealing element, while the head of the stud is adapted to centralize itself with respect to the other sealing element.

Signed by me at Jersey City, N. J., this 21st day of September, 1928.

WYLIE G. WILSON.